United States Patent [19]

Webb

[11] Patent Number: 5,475,778
[45] Date of Patent: Dec. 12, 1995

[54] SMART OPTICAL COUPLER AND SMART OPTICAL COUPLER SYSTEM

[75] Inventor: Brian A. Webb, Chandler, Ariz.

[73] Assignee: Motorola, Inc., Schaumburg, Ill.

[21] Appl. No.: 139,181

[22] Filed: Oct. 21, 1993

[51] Int. Cl.[6] .................... G02B 6/28; G02B 6/42; B29D 11/00
[52] U.S. Cl. .................. 385/31; 385/14; 385/15; 385/49; 385/88; 385/89; 385/92; 385/114; 385/24; 264/1.25
[58] Field of Search .................. 385/14, 24, 31, 385/39, 46, 49, 51, 76, 88, 89, 92, 139, 100, 115, 114; 345/904; 250/227.11, 227.14; 264/1.1, 1.5

[56] References Cited

U.S. PATENT DOCUMENTS

| | | | |
|---|---|---|---|
| 4,595,839 | 6/1986 | Braun et al. | 385/89 X |
| 4,911,519 | 3/1990 | Burton et al. | 385/14 X |
| 5,109,454 | 4/1992 | Okuno et al. | 385/92 |
| 5,119,451 | 6/1992 | Wills et al. | 385/14 |
| 5,123,066 | 6/1992 | Acarlar | 385/14 |
| 5,165,002 | 11/1992 | Cumberledge et al. | 385/92 |
| 5,199,087 | 3/1993 | Frazier | 385/14 |
| 5,345,527 | 9/1994 | Lebby et al. | 385/114 |
| 5,351,331 | 9/1994 | Chun et al. | 385/97 |
| 5,367,593 | 11/1994 | Lebby et al. | 385/53 |
| 5,371,820 | 12/1994 | Welbourn et al. | 385/76 |
| 5,371,822 | 12/1994 | Horwitz et al. | 385/89 |

FOREIGN PATENT DOCUMENTS

| | | | |
|---|---|---|---|
| 0412528 | 2/1991 | European Pat. Off. | 385/14 X |
| 0517369 | 12/1992 | European Pat. Off. | 385/14 X |
| 3436135 | 4/1985 | Germany | 385/14 X |
| 2218570 | 11/1989 | United Kingdom | 385/14 X |
| 2260836 | 4/1993 | United Kingdom | 385/14 X |

OTHER PUBLICATIONS

IBM Technical Disclosure Bulletin, R. A. Jarvela, Package for Electrical and Optical Components of Communications Port of Data Processing System, vol. 27, No. 8, Jan. 1985, pp. 4737–4738.

Primary Examiner—Brian Healy
Attorney, Agent, or Firm—Aaron B. Bernstein

[57] ABSTRACT

A smart optical connector (100) sends and recieves optical signals over optical fibers (200, 202). The smart otical connector (100) is capable of converting electrical signals to optical signals for transmission, and capable of converting optical signals to electrical signals for reception. Addtionally, the smart optical connector (100) comprises circuitry (217) for modifying the format of the electrical signals-to provide compatibility between various equiptment (414, 416, 418) which require differing formats.

20 Claims, 2 Drawing Sheets

SMART OPTICAL COUPLER AND SMART OPTICAL COUPLER SYSTEM

BACKGROUND OF THE INVENTION

The present invention relates, in general, to couplers for electronic equipment, and more particularly, to smart optical couplers.

It is sometimes desirable to provide communications between two or more electronic devices with optical cables. Optical cables provide extremely large bandwidths which allow tremendous amounts of data to be transmitted at very high speeds. However, the use of optical cables gives rise to a variety of challenges.

It should be understood that typical electronic equipment requires data and other signals in electronic form. In order to use optical cables for the communication of these electrical signals, the electrical signals must be converted into optical signals, and back again into electrical signals. Furthermore, particular types of electronic equipment require data and other electrical signals in corresponding particular formats. For instance, there are a variety of industry standards and specifications to which various equipment are built. Examples are equipment requiring signals and data formatted according to the the industry standard RS 232, as well as equipment requiring signals and data according to the industry standard IEEE 488.

In the past, separate systems have been provided to convert the electrical signals and data into optical signals for transmission over optical cables, and to convert one electrical signal and data format into another, as necessary to interlink various different equipment What is needed is a way to interconnect differing types of electronic equipment, using optical cable, which does not require one system for reformatting electrical signals and data and a separate system for converting electrical signals to optical signals for transmission over the cable.

DETAILED DESCRIPTION OF THE DRAWINGS

The present invention consist of a fiber optic ribbon terminating at the end in one or more modules permanently attached to the ribbon. The module is capable of both sending and receiving optical signals. A optical signal received will have additional processing carried out by the module in order to provide the equipment electronic data in the correct format for the equipment to correctly use transmitted information. In turn data generated by the equipment is received in an electronic format, processed in an appropriate manner and transmitted in an appropriate optical format.

The processing carried out by the module may be programmed during manufacture or may be actively modified by the sending or receiving equipment allowing it to perform various functions depending on the requirement.

Figure 1:
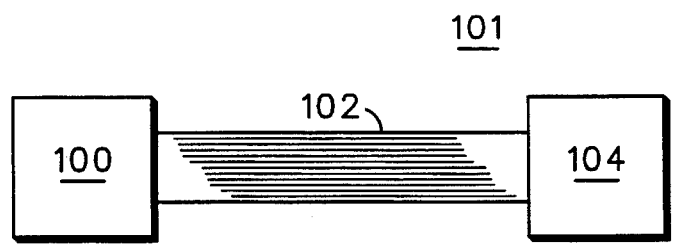
FIG. 1 is a top view of a smart optical connector system in accordance with a preferred embodiment of the present invention.

Turning now to the figures for a more detailed understanding, FIG. 1 is atop view of a smart optical coupler system 101 in accordance with the preferred embodiment of the present invention. Specifically, system 101 includes smart optical coupler 100, optical cable 102 and smart optical coupler 104. The workings of the couplers are described in more detail below. In the preferred embodiment, optical cable 102 comprises twenty optical waveguide fibers which may be glass or plastic, or other suitable materials, as is well known in the industry. Any industry standard fiber may be used, however care must be exercised in matching maximum transmission loss to the intensity and wave length of the optical signal.

According to the preferred embodiment, ten of the twenty waveguide fibers are for transmission of data in one direction, e.g., from coupler 100 to coupler 104. Furthermore, the other ten fibers are for transmission of data in the other direction, e.g. from coupler 104 to coupler 100. It will be understood, however, that a one way cable may be appropriate under certain circumstances. Additionally, it should be understood that any number of fibers may be employed as one directional or bi-directional. Optical cable 102 may also be referred to as an optical waveguide cable.

Figure 2:
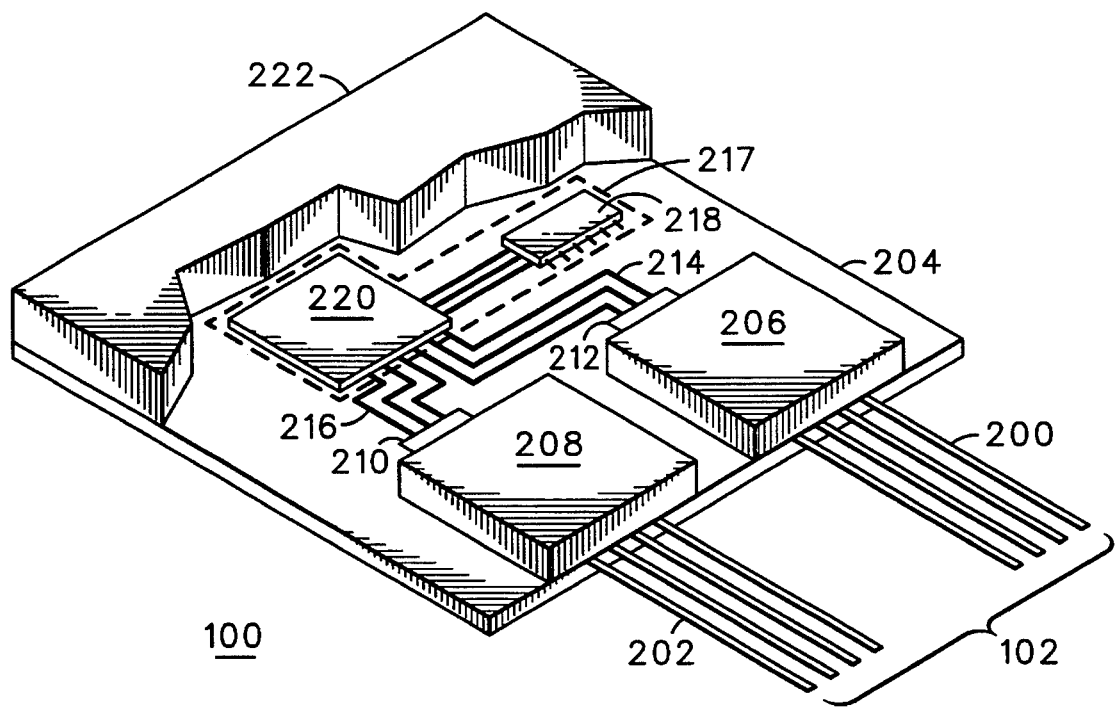
FIG. 2 is a perspective cut away view of a smart optical connector in accordance with a preferred embodiment of the present invention.

Turning to FIG. 2 for a more detailed description of the smart optical couplers, FIG. 2 is a cutaway perspective view of smart optical coupler 100 shown in FIG. 1. Smart optical coupler 104 shown in FIG. 1 may be identical to coupler 100 in certain applications. However, it should be understood, as will become more apparent with the following discussion, that coupler 104 may vary somewhat from connector 101, particularly with regard to the electronic processing circuitry within the coupler.

As indicated in FIG. 2, a first group of optical fibers 200 combined with a second group of optical fibers 202 compose optical cable 102 shown in FIG. 1. In the preferred embodiment, fiber groups 200 and 202 each comprise ten fibers. Each group is responsible for a single direction of communication, i.e. transmit or receive. For illustrative purposes, optical fiber group 202 and its related path will be referred to as the receive side, while optical fiber group 200 and its related path will be referred to as the transmit side.

Fibers 202 are coupled to waveguide section 208, which in the preferred embodiment is a portion of Guidecast™. Waveguide section 208 is optically coupled at its output to optical-electrical transducer 210. Since this is the receive side, transducer 210 is an optical signal to electrical signal converter. The Guidecast™ 208 consist of precision optical guides which align the optical signal from the optical cable 202 to the active portion of an optical-electrical transducer 210, such as a photo diode or other similar device capable of translating optical signals to electrical signals at the necessary speed.

In the preferred embodiment, the output of optical signal to electrical signal converter 210 is coupled to solid state microprocessor 220 via printed traces 216. In the preferred embodiment, solid state microprocessor 220 comprises a single semiconductor die. Associated with microprocessor 220 is surface mount device 218. Surface mount device 218 represents additional electronic circuitry required for the functioning of the smart coupler. Surface mount device 218 is coupled to microprocessor 220 via printed traces 219. Microprocessor 220 and surface mount device 218 together compose electrical processing circuit 217 for processing the electrical signals associated with the transmitted and received optical signals. It will be understood that electrical processing circuit 217 shown is merely representative, and may differ greatly within the scope of the present invention.

Regarding the receive path, signals coming in on fiber group 202 and converted to electrical signals via optical signal to electrical signal converter 210 will be considered standard signals, and may be in any particular electrical signal and data format. Electrical processing circuit 217 is capable of actively altering or adapting the standard electrical signals on traces 216 for a specific application by, for example, altering their format. In the case of the receive path being discussed, the altered signal is coupled to an electrical interface (shown in FIG. 3), which in the preferred embodiment comprises pins of a pin grid array.

Electrical processing circuit 217 is capable of actively altering or adapting the standard electrical signals on traces 216 for a specific application by, for example altering their format from analog to digital technology. In the case of the receive path being discussed, the altered signal is coupled to an electrical interface (shown in FIG. 3), which in the preferred embodiment comprises pins of a pin grid array. It will be understood that the electrical interface 100 shown is merely representative, and may differ greatly within the scope of the present invention. The transmit path associated with fiber group 200 is very similar to the receive path associated with fiber group 202. In the case of a transmitted signal, electrical signals of a particular format pass through electrical processing circuit 217. These signals may be in one particular format and converted to another by circuit 217, or the may pass through circuit 217 unaltered. If two different formats are involved, either may be considered a standard format, and the other a particular format. For example analog data may pass thru the electrical processing circuit for use in an application while portions of the analog data may be converted to digital for a separate use.

The electrical signals are conducted via printed traces 214 to the conductive leads of the Guidecast™ 206. The optical-electrical transducer 212 is connected to the termination of these leads. With respect to this transmit side, optical-electrical transducer 212 comprises an electrical signal to optical signal converter. Converter 212 is precision coupled to Guidecast™ portion 206 in, such a way as to align the multiple optical signals with the termination of the optical fibers 200. The electrical to optical signal converter consist of a device capable of generating optical signals at high speeds. These signals may or may not be visible to the human eye. Light emitting diodes and laser diodes are examples of such devices.

In the preferred embodiment optical cable 102 comprising fiber groups 200 and 202, along with Guidecast™ portions 206 and 208, transducers 210 and 212, as well as electrical processing circuit 217 are all included in a single integral unit. In the preferred embodiment, each of the components of the coupler are positioned on a common substrate 204. Additionally, the substrate and components are overmolded with molding compound 222. It should be understood that FIG. 2 is a cutaway view, and that in practice molding compound 222 would cover all of the components and a portion of the optical cable near the components.

In the preferred embodiment, each of the components of the coupler are positioned on the substrate using well known technology to provide reliable electrical contact to the traces 214, 216. Fiber groups 200 and 202 are connected to Guidecast™ mechanically. Additionally, the substrate and components are overmolded with appropriate protective compound to provide environmental and mechanical protection, a premolded cover or a combination of each may serve the same purpose.

Figure 3:
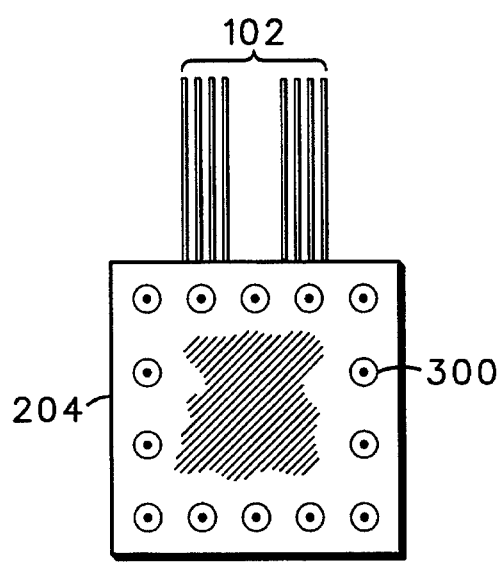
FIG. 3 is a bottom view of the connector of FIG. 2.

Turning to FIG. 3, FIG. 3 illustrates the electrical interface between the electrical processing circuitry of coupler 100 and external equipment to which coupler 100 would be connected. Specifically, in the preferred embodiment coupler 100 takes the form of a pin grid array comprising pins represented by pin 300. Pins represented by pin 300 have one end coupled to the electrical processing circuitry of the coupler and the other end coupled to external equipment (shown in FIG. 4). The prefered embodiment pin grid array will meet industry standard pin out configurations such as J.E.D.I.C. or E.I.A.J., in order to be compatible with either board or socket conventions.

It should be understood, however, that although shown as a pin grid array, the coupler may take a variety of forms including other industry standard couplers such as D-type couplers.

Figure 4:
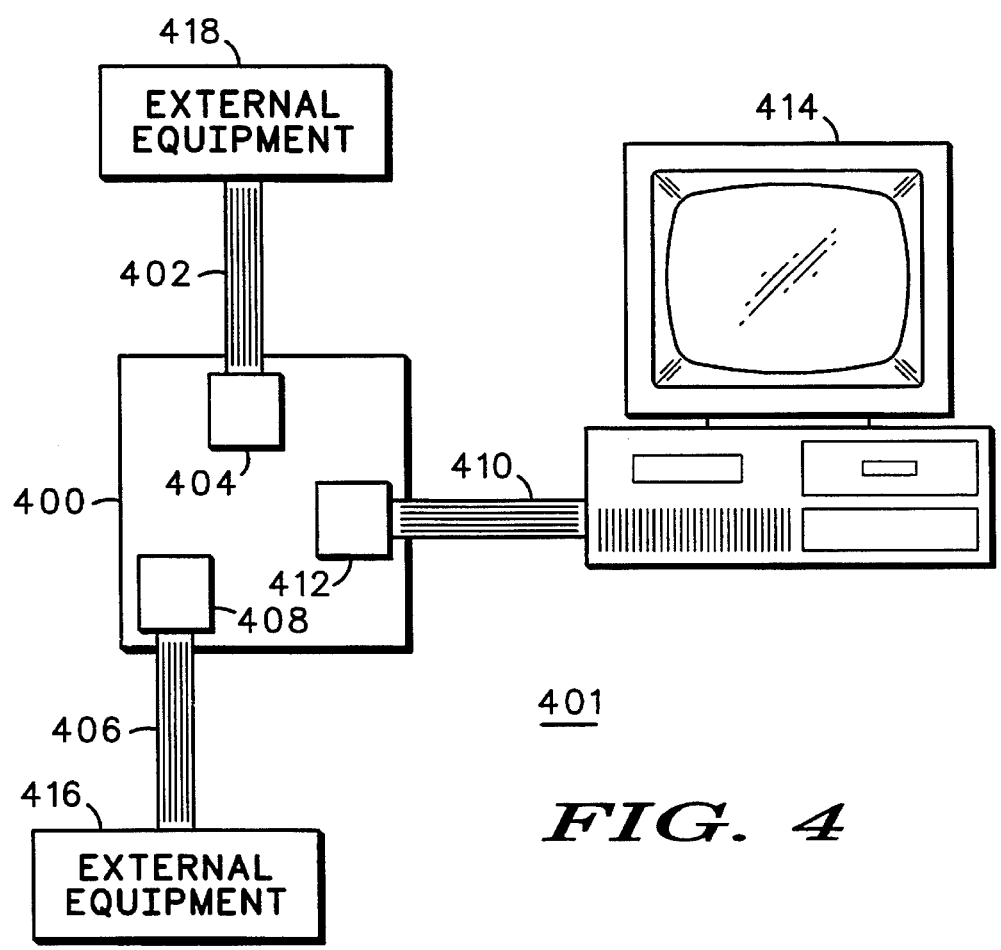
FIG. 4 is a schematic diagram of a distributed data bus network employing smart optical connector systems in accordance with a preferred embodiment of the present invention.

Turning to FIG. 4, FIG. 4 is a schematic view illustrating distributed data bus network 401 employing smart optical coupler systems in accordance with the present invention. Distributed data bus network 401 comprises three pieces of external equipment, 416, 414 and 418. External equipment 416 and 418 are referred to generally, and may take almost any form, including printers, modems, automated equipment, etc. External equipment 414 is shown as a computer terminal, for illustrative purposes. Distributed data bus network 401 further comprises hub 400. It should be understood by those skilled in the art that hub 400 is a hub of the nature well known in the network industry, but particularly adapted for use with the smart optical coupler systems in accordance with the present invention.

Computer terminal 414 is connected via optical cable 410 and smart optical coupler 412 to hub 400. Optical cable 410 and coupler 412 are analogous to cable 102 and coupler 100, respectively, shown in FIG. 1. Additionally, although not shown, a coupler analogous to coupler 104 of FIG. 1 resides in computer terminal 414.

Similarly, external equipment 416 is connected via optical cable 406 and coupler 408 to hub 400. Again, a smart optical coupler which is not shown resides within external equipment 416.

Furthermore, external equipment 418 is coupled via optical cable 402 and coupler 404 to hub 400. Additionally, a smart optical coupler which is not shown resides within external equipment 418.

External equipment 416 can be considered a first location external equipment, while external equipment 418 can be considered a second location external equipment. The distributed data bus network 401 including hub 400 and the various smart optical coupler systems provides for a sophisticated interconnection and switching network. The equipment on the network may require a variety of signal and data formats. The smart optical coupler systems are capable of making the equipment compatible with one another.

An optical network created by the smart optical coupler system would be utilized to connect a number of multifunctional equipment capable of interactively transmitting information between one another. It will be understood that an infinite number of configurations may be constructed to provide distributed data bus networks.

It should now be appreciated that the smart optical coupler provides a method of preprocessing optical data transmitted at very high rates between equipment. The active preprocessing of the optical signal after or before transmission allows equipment requiring various data formats to be interconnected interactively. Smart optical hubs will allow the creation of networks of interactive equipment transmitting at speeds not possible over wire interconnections.

I claim:

1. A smart optical coupler comprising:

an optical cable carrying optical data in a first optical digital format;

an optical-electrical transducer coupled to the optical cable, the optical-electrical transducer converting the optical data in the first optical digital format to first electrical data in a first electrical digital format;

an electrical processing circuit coupled to the optical-electrical transducer, the electrical processing circuit receiving the first electrical data in the first electrical digital format, the electrical processing circuit converting the first electrical data in the first electrical digital format to second electrical data in a second electrical digital format;

an electrical interface including a first end and a second end, the electrical interface coupled at the first end to the electrical processing circuit and at the second end to the external equipment, the external electrical equipment adapted to receive the second electrical data in the second electrical digital format; and wherein the optical cable, the optical-electrical transducer, the electrical processing circuit and the electrical interface are included in a single, integral unit.

2. The coupler of claim 1, wherein the single, integral unit comprises an overmolded package.

3. The coupler of claim 1, wherein the single, integral unit comprises a pin grid array coupler comprising a plurality of pins, and wherein the electrical interface comprises the pins.

4. The coupler of claim 1, wherein the optical cable comprises twenty optical waveguide fibers.

5. The coupler of claim 1, wherein the optical cable comprises ten optical waveguide fibers.

6. The coupler of claim 1, further including Guidecast™ optical waveguide coupled at a first end to the optical cable and at a second end to the optical-electrical transducer.

7. The coupler of claim 1, wherein the optical-electrical transducer and the electrical processing circuit are positioned on a common substrate.

8. The coupler of claim 1, wherein the external equipment comprises a distributed data bus network.

9. The coupler of claim 1, wherein the external equipment comprises a data bus network hub.

10. The coupler of claim 1, wherein the electrical processing circuit comprises a microprocessor.

11. A smart optical coupler system comprising:

a first coupler including;
  a first electrical interface coupled at a first end to first location external equipment adapted to transmit first electrical data in a first electrical digital format, the first electrical interface coupled at a second end to an electrical signal to optical signal converter converting the first electrical data in the first electrical digital format to optical data in a first optical digital format;

a second coupler including:
  an optical signal to electrical signal converter converting the optical data in the first optical digital format to the first electrical data in the first electrical digital format;
  a second electrical interface coupled at a first end to second location external equipment adapted to receive second data in a second electrical digital format, the second electrical interface coupled at a second end to the optical signal to electrical signal converter;

an optical waveguide cable connecting the first coupler to the second coupler; and wherein the second coupler is a single integral unit including an electrical processing circuit coupled between the optical signal to electrical signal converter and the second location external equipment, the electrical processing circuit converting the first electrical data in the first electrical digital format to the second electrical data in the second electrical digital format.

12. The system of claim 11, wherein the optical waveguide cable comprises twenty optical waveguide fibers.

13. The system of claim 11, wherein the second location external equipment comprises a distributed data bus network.

14. The system of claim 11, wherein the second location external equipment comprises a hub of a distributed data bus network.

15. A smart optical coupler comprising:

an optical cable;

an optical-electrical transducer coupled to the optical cable;

a microprocessor coupled to the optical-electrical transducer, the microprocessor converting first electrical data in a first electrical digital format to second electrical data in a second electrical digital format;

an electrical interface including a first end and a second end, the electrical interface coupled at the first end to the microprocessor and at the second end to external equipment, the electrical interface adapted to transmit and receive the second electrical data in the second electrical digital format; and wherein the optical cable, the optical-electrical transducer, the electrical interface and the microprocessor are included in a single, integral package.

16. The coupler of claim 15, wherein the single integral package comprises an overmolded package.

17. The coupler of claim 15, wherein the single, integral package comprises a pin grid array package.

18. The coupler of claim 15, further comprises Guidecast™ optical waveguide coupled at a first end to the optical cable and at a second end to the optical-electrical transducer.

19. The coupler of claim 15, wherein the optical-electrical transducer and the microprocessor are positioned on a common substrate.

20. A smart optical coupler comprising:

An optical cable carrying optical data in a first optical digital format;

an optical-electrical transducer coupled to the optical cable, the optical-electrical transducer converting the optical data in the first optical digital format to first electrical data in a first electrical digital format;

an electrical processing circuit coupled to the optical-electrical transducer, the electrical processing circuit receiving the first electrical data in the first electrical digital format, the electrical processing circuit converting the first electrical data in the first electrical digital format to second electrical data in an analog format;

an electrical interface including a first end and a second end, the electrical interface coupled at the first end to the electrical processing circuit and at the second end to external equipment adapted to receive the second electrical data in the analog format; and wherein the optical cable, the optical-electrical transducer, the electrical processing circuit and the electrical interface are included in the single, integral unit.

* * * * *